United States Patent Office 3,118,390
Patented Jan. 21, 1964

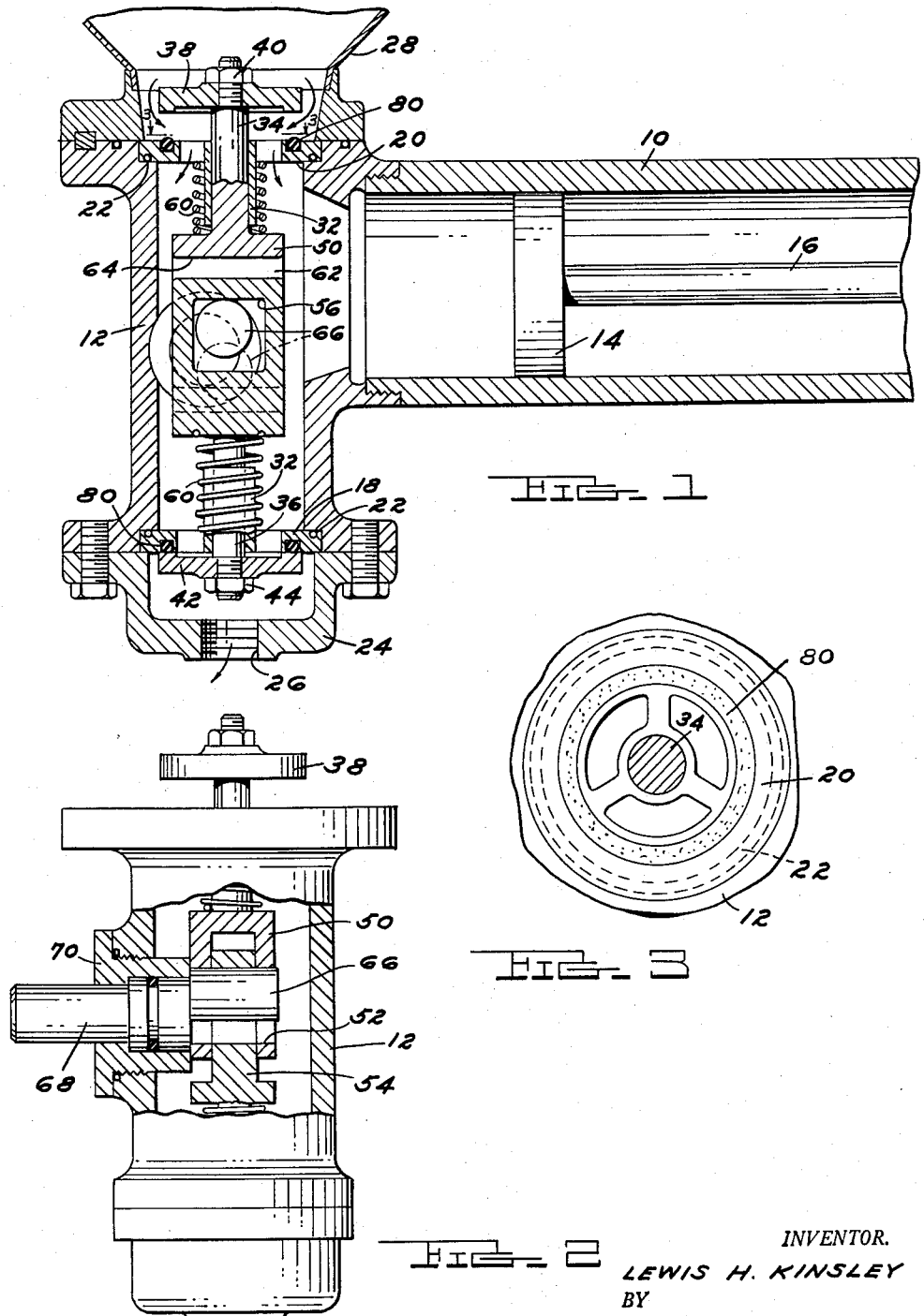

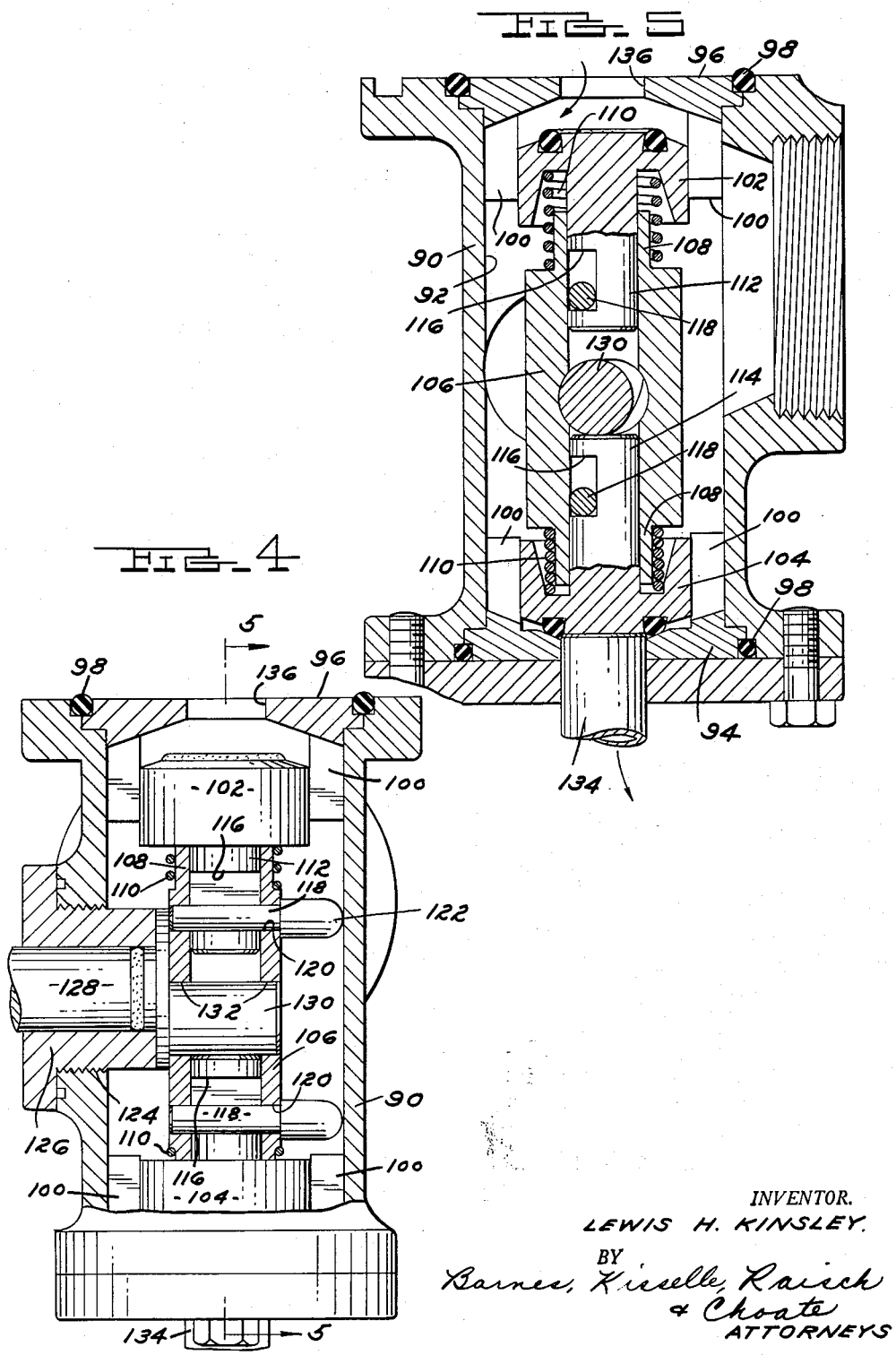

3,118,390
FILL VALVE
Lewis H. Kinsley, Detroit, Mich., assignor to Arthur Colton Company, Detroit, Mich., a corporation of Michigan
Filed Apr. 1, 1960, Ser. No. 19,328
11 Claims. (Cl. 103—227)

This invention relates to a fill valve, particularly to be used in pharmaceutical products but having general application for any filling operation where the quantities are deisred to be reasonably accurate.

The use of a plunger for driving material through a fill valve is known, and in some cases check valves have been used, one to admit the charge into a charging chamber and the other to release the charge from the charging chamber.

In some cases, particularly with watery liquids of low viscosity, there has been a problem in maintaining proper seal on the check valves to prevent leakage and ultimate non-fill or over-fill. This is particularly true where the check valves may be subject to vibration on a machine.

Similarly, sometimes spring closed valves are used for this type of device but in handling liquids of more viscous character, frequently the suction created in the moving of the liquids can open the spring closed valves and cause defective filling.

It is an object of the present invention to provide a valve which can be used with liquids of all viscosities and which will positively meter the material without danger of leakage or short supply on metered filling operations. Briefly, the invention comprises the use of opposed valves which are simultaneously operated positively one to a closed position and another to an open position, the valves being flexibly associated during portions of the stroke but one of them being positively closed during the extreme open position of the other.

Additional objects and features of the invention relating to details of construction and operation will be apparent in the following description and claims.

Drawings accompany the disclosure and the various views thereof may be briefly described as:

FIGURE 1 illustrates the general assembly of the device showing a first modification with poppet valves closing from the outside.

FIGURE 2 illustrates a side view of the assemblies of FIGURE 1 partially in section.

FIGURE 3 is an end view of one of the valve seats.

FIGURE 4 is a view of a modified type of valve using the inside of the valve seat as a closer surface.

FIGURE 5 is a sectional view on line 5—5 of FIGURE 4.

Referring to the drawings:

FIGURE 1 illustrates a combined piston and valve housing having a horizontal cylinder 10 and a valve housing 12 mounted transversely thereto. The cylinder 10 has a piston 14 actuated by a rod 16. The valve housing 12 is a cylindrical element having a central bore with a valve seat 18 recessed at one end and a valve seat 20 recessed at the other end, there being suitable sealing rings 22 provided in the valve seats to seal them in the recess.

On the bottom of housing 12 is an outlet cap 24 having a nozzle opening 26. A suitable supply hopper assembly 28 is provided at the top of the valve housing suitably affixed thereto by cap screws (not shown). It will be noted that each of the valve housings extends inwardly to the point that it overlaps the outer rim of the valve seats 18 and 20, thus holding them in place.

It will be noted that each valve seat member 18 and 20 has a central annular neck portion 32 which serves as a guide for the valve stems 34 and 36 at the top and bottom of the unit and as spring guides. On the end of the top valve stem 34 is a valve disc 38 held in place by a nut 40. At the end of the valve stem 36 is a valve disc 42 held in place by a nut 44.

The valve stem 32 extends upwardly from a bifurcate driving member 50, each branch of which is provided with a substantially square opening 52. Extending upwardly from the valve stem 36 is an actuator element 54 which positions between the branches of the bifurcate member 40 and which is also provided with a substantially square opening 56 which registers with the opening 52. Springs 60 surround the valve stem guides seating on the members 50 and 54 at shoulders formed thereon and seating at the other end against the seats 18 and 20. Both of the valve members are thus urged toward closed position by the springs. It will be noted that in the assembly as shown in FIGURES 1 and 2, there is a clearance 62 between the upper end of the member 54 and the base 64 of the slot between the legs of the birfucate member 50.

As shown best in FIGURE 2, the drive means for the valves comprises an eccentric projection 66 on a cylindrical drive member 68 mounted in a thimble insert 70 threaded into the side wall of the valve housing 12. The member 66 constitutes a throw which has a lost motion connection with the members 50 and 54 but which actuates the valves mechanically in turn. As the valves are shown in FIGURES 1 and 2, the throw 66 has raised the valve 38 to open position and is also holding valve 42 in closed position. As the throw continues to the bottom position shown in dotted lines in FIGURE 1, it will allow the valve 38 to close and hold it closed as it reaches the end of the stroke to open the valve 42. Thus while the throw 66, upon rotation of the member 68, opens a single valve against the spring closing action, at the same time it clamps the other valve in closed position momentarily at the end of the opening stroke to permit the plunger 14 to eject material through the outlet opening 26.

Each valve seat has a sealing ring 80, which in normal position projects axially beyond the surface of the valve seats to compress and seal against the valves 38 and 42.

Referring to the modifications in FIGURES 4 and 5, a housing 90 has a valve core 92 which is closed by valve seats 94 and 96 at each end, sealed by O-rings 98. The valve seats have circumferentially spaced projections 100 which serve as guides for valve heads 102 and 104 slidable in a central sleeve 106. The sleeve 106 has a small extension guide 108 which serves as a locator for springs 110, the springs being recessed around the drive studs 112 and 114 of the valves 102 and 104.

Each stud 112 and 114 has a side notch 116 which receives a cross-pin 118, the pin being anchored in a cross hole 120 in the sleeve 106. Each pin has a head 122 which rides along the side of the housing 90 to hold the pin in place when assembled. The housing 90 has a side recess 124 which receives a threaded thimble 126 mounting a shaft 128 which has an eccentric throw 130. The throw 130 is rotatably received in openings 132 in the sleeve 106. Thus the valves 102 and 104 are driven not only by the springs 110 which exert pressure on them but also in certain positions are positively actuated by the pins 118.

For example, as shown in FIGURE 5, the valve 102 is held open by the pin 118 and the valve 104 is held closed by the pin 118. As the eccentric throw 130 moves in its path of travel, the pins will rise in a lost motion connection and at the other extreme of the stroke the opposite condition will hold with the valve 102 positively closed and the valve 104 opened. A tube 134 can provide an outlet for the device and the inlet can be through the opening 136 with a suitable hopper mounted on the top of the housing.

It will thus be seen that I have disclosed two modifications of a valve which is essentially a spring closed poppet valve but which is so arranged that at certain portions of the stroke one valve is positively closed while the other is opened. It is then possible to feed measured amounts of fluid having varying degrees of viscosity without a disturbing leakage which would interfere with the volumetric discharge. The operation of the eccentric throws is synchronized with the operation of the piston 14 to cause intake and outlet of the fluid being measured.

What is claimed is as follows:

1. A volumetric measuring valve for liquids which comprises a housing having an elongate valve chamber, means for supplying a fluid to be measured to said housing and means to receive a fluid to be measured from said housing, a means for drawing a fluid into said housing and discharging it from said housing, said housing having an inlet valve seat and an outlet valve seat, independently mounted valves cooperating with each of said seats, means on said seats and means on said valves for cooperating to guide said valves toward a seating position on said seats, spring means for actuating said valves toward closed position, and means having a lost motion connection with said valves operable to open each valve selectively while the other remains closed by said spring means, said last-mentioned means directly engaging the closed valve at the end of the opening stroke for the opened valve to lock the closed valve in closed position independently of said spring means.

2. In a volumetric measuring chamber having an inlet and an outlet, and means for metering liquid in and out of said chamber, a valve seat at said inlet and a valve seat at said outlet, independently mounted valves at each seat to open and close said seat, resilient means for biasing said valves to the closed position at all times, and actuating means having a lost motion connection with said valves operable selectively to engage and open one of said valves while the other valve remains closed by said resilient means and including means to positively engage and hold the other of said valves closed independently of said resilient means as the opening valve reaches the end of its opening travel.

3. A device as defined in claim 2 in which the housing comprises an elongate body having a straight central bore, an annular recess at each end of said bore for receiving a valve seat in sealing relation, said valve seat having axially projecting guide means, the valves being slidably located at each end of said bore movable in said guide means to a position to close and to open said valve seat, means on each of said valves projecting toward each other and toward the center of the bore, said actuating means being engageable with said last means via said lost motion connection to open and to hold said valves respectively.

4. A device as defined in claim 3 in which the means extending toward each other on the valves comprises a bifurcate member on one and a single member on the other interposed between the branches of the bifurcate member, the actuating means comprising an eccentric throw projecting through the wall of said body and through said members.

5. A device as defined in claim 2 in which each of said valves has a stem extending concentrically and axially toward each other, a sleeve surrounding said stems, the actuating means comprising an eccentric throw passing transversely through an opening in said sleeve to move said sleeve axially upon rotation of said throw, and transverse pins extending through said sleeve and through said stems, said stems having an axial notch in which said pins operate, the ends of said notches serving to provide a positive positioning surface for said valves in the fully closed and fully opened position.

6. A device as defined in claim 5 in which the pins extending through said sleeve have a head in contact with the inner surface of said bore to hold said pins in assembled position in said sleeve.

7. In a volumetric measuring chamber having an inlet and outlet and means for metering liquid in and out of said chamber, an elongate body having a straight central bore, an annular seat at each end of said bore, a valve for each of said seats, each valve comprising a disc for closing said seat and a stem passing through said seat into the central portion of said body, means centrally of said seats and guiding said valve stems, overlapping means on said stems having a hole therethrough transverse of said body, an eccentric actuating throw extending into said body transversely thereof and received in said holes of said overlapping means, said holes having a larger diameter than said throw and being positioned such that at one extreme position of said throw one of said valves is open and the other is positively held in closed position and at the other extreme position of said throw the first of said valves is closed and the other is an extreme open position, and resilient means for biasing said valves to closed position during the intermediate motions of said throw.

8. In a volumetric measuring chamber having an inlet and outlet means for metering liquid in and out of said chamber, an elongate body having a straight central bore, an annular seat at each end of said bore, a valve for each of said seats, each of said valves comprising a body portion and a stem portion projecting inwardly of said body, a sleeve slidably receiving said stem portions, spring means seated on said valves and the respective ends of said sleeve to bias said valves toward closed position, an eccentric throw extending transversely into said valve body, passing through an opening in said sleeve to actuate said sleeve axially of said body, and a lost motion connection between each of said valve stems and said sleeve positioned to cause an opening motion of one of said valves as said sleeve is shifted toward one end of said housing and to lock the other of said valves in its closed position in the full open position of said first valve, said valves being selectively so operated by said throw.

9. A device as defined in claim 8 in which each valve body is provided with an annular recess adjacent the valve stem serving as a seat for a coil spring and each end of the sleeve is provided with an annular collar terminating in a shoulder which serves as a locator and a seat for the other end of the coil spring.

10. In combination with a volumetric measuring chamber having an inlet and an outlet, means for creating alternate low and high pressures in said chamber to move a flowable substance in and out of said chamber, a valve control system for controlling the inlet of material into said chamber and the outlet of material from said chamber comprising a means forming a valve seat at said inlet and means forming a valve seat at said outlet, a valve member at each seat to open and close said seat, means for biasing said valves independently to the closed position at all times, and actuating means operable selectively to engage and open one of said valves relative to its valve seat in an opening stroke while the other of said valves remains closed by said biasing means and adapted to engage the other of said valves only at the end of said opening stroke of the said one valve to hold the other of said valves positively in a closed position independently of said biasing means.

11. In a volumetric measuring chamber having an inlet and an outlet, and means for metering liquid in and out of said chamber, a valve seat at said inlet and a valve seat at said outlet, independently mounted valves at each seat movable to open and close said seat, resilient means for biasing said valves to the closed position at all times, actuating means movable in a defined stroke in said chamber between said inlet and outlet for operating said valves, and spaced means on each of said valves engageable with said actuating means wherein a motion of said actuating means in said chamber between said inlet and outlet will selectively engage said spaced means to open one of said valves and positively engage and hold the other of said valves closed as the opening valve reaches the end of its opening travel and the actuating means reaches the end of a stroke in each direction.

References Cited in the file of this patent

UNITED STATES PATENTS

| | | |
|---|---|---|
| 643,406 | Fritz | Feb. 13, 1900 |
| 702,903 | Abendroth | June 24, 1902 |
| 714,604 | Petsche | Nov. 25, 1902 |
| 1,399,283 | Zucker | Dec. 6, 1921 |
| 1,516,310 | Ryan | Nov. 18, 1924 |
| 1,857,626 | Edmunds | May 10, 1932 |
| 2,169,773 | Slater et al. | Aug. 15, 1939 |
| 2,504,145 | Morrone | Apr. 18, 1950 |
| 2,529,457 | Nilsson | Nov. 7, 1950 |
| 2,817,463 | Stokes | Dec. 24, 1957 |